(12) United States Patent
Jiang et al.

(10) Patent No.: US 12,535,926 B2
(45) Date of Patent: Jan. 27, 2026

(54) TOUCH PANEL AND TOUCH DISPLAY PANEL

(71) Applicants: Chengdu BOE Optoelectronics Technology Co., Ltd., Sichuan (CN); BOE Technology Group Co., Ltd., Beijing (CN)

(72) Inventors: Liqing Jiang, Beijing (CN); Qiang Wang, Beijing (CN); Guiyu Zhang, Beijing (CN); Shukui Yang, Beijing (CN); Shuai Liu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 19/026,241

(22) Filed: Jan. 16, 2025

(65) Prior Publication Data

US 2025/0156018 A1 May 15, 2025

Related U.S. Application Data

(63) Continuation of application No. 18/036,087, filed as application No. PCT/CN2022/086301 on Apr. 12, 2022, now Pat. No. 12,236,050.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
None
See application file for complete search history.

(56) References Cited

U.S. PATENT DOCUMENTS

2020/0285349 A1* 9/2020 Lin .................. G06F 3/0412

FOREIGN PATENT DOCUMENTS

JP 2014153791 A * 8/2014

* cited by examiner

*Primary Examiner* — Nicholas J Lee
(74) *Attorney, Agent, or Firm* — IPro, PLLC (57) ABSTRACT

The present disclosure relates to a touch panel and a touch display panel. The touch panel includes: a substrate including a front surface, including first and second directions that intersect with each other; first touch electrodes extending in the first direction and arranged in the second direction are disposed on the front surface, the first touch electrode includes first sub electrodes, and adjacent first sub electrodes are electrically connected to each other via a connecting member; second touch electrodes extending in the second direction and arranged in the first direction are further on the front surface, the second touch electrode includes second sub electrodes, and adjacent second sub electrodes are electrically connected to each other via a bridging member; the connecting member partially overlaps with the bridging member and is insulated from the bridging member; the bridging member is provided with at least one transparent hole penetrating the bridging member.

20 Claims, 7 Drawing Sheets

TOUCH PANEL AND TOUCH DISPLAY PANEL

CROSS-REFERENCE TO RELATED APPLICATIONS

This application is a continuation application of U.S. patent application Ser. No. 18/036,087 filed on Apr. 12, 2022, the entire contents of which are incorporated herein by reference.

TECHNICAL FIELD

The present disclosure relates to the field of display technology, and more particularly, to a touch panel and a touch display panel.

BACKGROUND

In related art, with the continuous development of technology, it has seen increasingly widespread demand for human-computer interaction, and a large number of touch display panels have been used in central control displays on cars.

In addition, with requirements on display effects also increasing, high visibility at bridge joints of touch panels can greatly affect the display effects.

SUMMARY

The present disclosure provides a touch panel and a touch display panel, to address all or part of the deficiencies in relevant art.

According to a first aspect of the embodiments of the present disclosure, there is provided a touch panel, wherein the touch panel includes a substrate including a front surface; the front surface includes a first direction and a second direction that intersect with each other;
- a plurality of first touch electrodes extending in the first direction and arranged in the second direction are disposed on the front surface, the first touch electrode includes a plurality of first sub electrodes, and adjacent first sub electrodes are electrically connected to each other via a connecting member;
- a plurality of second touch electrodes extending in the second direction and arranged in the first direction are further disposed on the front surface, the second touch electrode includes a plurality of second sub electrodes, and adjacent second sub electrodes are electrically connected to each other via a bridging member;
- the connecting member partially overlaps with the bridging member and is insulated from the bridging member;
- the bridging member is provided with at least one transparent hole penetrating the bridging member.

It can be seen from the above embodiment, since the bridging member is provided with at least one transparent hole, light that would pass through the bridging member can pass through the transparent hole, to reduce the light passing through the bridging member. Therefore, the light passing at the bridging member and the light passing at the touch electrode can pass through relatively similar film structures, and the properties of the light passing at the bridging member can be similar to those passing at the touch electrode, thereby reducing the visibility of the film structure at the bridging member, which can avoid the direct observation of the film structure at the bridging member and improve the display effect. In addition, when the transparent hole is not filled with insulating material, the transparent hole can reduce a contact area between the bridging member and the insulating film, thereby improving stress matching between the bridging member and the insulating film, and thereby improving the adhesion between the bridging member and the insulating film. In addition, due to the presence of a transparent hole on the bridging member, it is possible to divide the bridging member into at least two sub bridging members respectively located on two sides of the transparent hole by at least one transparent hole. Therefore, when the bridging member is subjected to static discharge, even if one sub bridging member is damaged or broken due to static discharge, the other sub bridging members can still work normally, thereby improving the anti-static discharge ability of the bridging member.

In some implementations, the at least one transparent hole penetrates the bridging member to form at least two hole edges; the at least two hole edges have different shapes.

In some implementations, the at least one transparent hole penetrates the bridging member to form at least two hole edges; the hole edge has a shape selected from a group consisting of: a continuous arc with irregular variation, a double-segment polyline with irregular variation, and a triple-segment polyline with irregular variation.

In some implementations, the transparent hole has a shape the same as a shape of the bridging member.

In some implementations, the transparent hole is disposed at a center of the bridging member.

In some implementations, a projection of the transparent hole on the substrate overlaps at least partially with a projection of the second touch electrode on the substrate.

In some implementations, the bridging member and the connecting member are insulated from each other through an insulating film, and an insulating material is provided between the first touch electrode and the second touch electrode, and an insulating material is provided in the transparent hole;
- the insulating material in the transparent hole, the insulating material between the first touch electrode and the second touch electrode, and the insulating material forming the insulating film are the same insulating material.

In some implementations, one transparent hole is disposed on the bridging member;
- a width of the transparent hole at the widest part is 43%-86% of a width of the bridging member, and a length of the transparent hole at the longest part is 54%-73% of a length of the bridging member.

In some implementations, a width of the transparent hole at the widest part is 30 mm-60 mm; a length of the transparent hole at the longest part is 140 mm-190 mm.

In some implementations, at least two transparent holes are disposed on the bridging member and arranged along a length direction of the bridging member;
- along a width direction of the bridging member, a width of each transparent hole at the widest part is 43%-86% of a width of the bridging member; along a length direction of the bridging member, a maximum value of a sum of lengths of the at least two transparent hole is 54%-73% of a length of the bridging member.

In some implementations, along the width direction of the bridging member, the width of each transparent hole at the widest part is 30 mm-60 mm; along the length direction of the bridging member, the maximum value of the sum of the lengths of the at least two transparent holes is 140 mm-190 mm.

In some implementations, at least two transparent holes are disposed on the bridging member and arranged along a width direction of the bridging member;

along a width direction of the bridging member, a maximum value of a sum of widths of the at least two transparent holes is 43%-86% of a width of the bridging member; along a length direction of the bridging member, a length of each transparent hole at the longest part is 54%-73% of the length of the bridging member.

In some implementations, along the width direction of the bridging member, a maximum value of a sum of widths of the at least two transparent holes is 30 mm-60 mm; along the length direction of the bridging member, the length of each transparent hole at the longest part is 140 mm-190 mm.

In some implementations, the touch panel further includes a passivation layer, a first vanishing layer, and a second vanishing layer; the second vanishing layer is located on a side of the bridging member proximate to the substrate, and the first vanishing layer is located on a side of the connecting member away from the substrate; the passivation layer is located on a side of the first vanishing layer away from the connecting member.

In some implementations, materials of the first touch electrode, the second touch electrode, the connecting member, and the bridging member all include transparent conductive materials.

In some implementations, the transparent conductive material includes indium tin oxide.

In some implementations, the first touch electrode is integrally formed with the connecting member; a thickness of the connecting member is smaller than a thickness of the first touch electrode, so that the first sub electrode and the connecting member jointly form a groove, and the bridging member is arranged in the groove; the first touch electrode includes a first surface and a second surface opposite each other; a surface of the connecting member away from the bridging member is flush with the first surface, and a surface of the bridging member away from the connecting member is flush with the second surface.

In some implementations, the bridging member includes a first edge and a second edge located respectively on two sides of the bridging member; each of the first edge and the second edge includes at least one turning point, wherein the at least one turning point divides the first edge into at least two first sub edges, and the at least one turning point divides the second edge into at least two second sub edges; each of an angle between the first sub edges and an angle between the second sub edges is greater than or equal to 90 degrees and less than 180 degrees.

In some implementations, part of the first sub edges and some of the second sub edges are parallel to the first direction or the second direction, while the other part of the first sub edges and the other part of the second sub edges are neither parallel nor perpendicular to the first direction or the second direction;

or, each first sub edge and each second sub edge are parallel to the first direction or the second direction;

or, each first sub edge and each second sub edge are neither parallel nor perpendicular to the first direction or the second direction.

According to a second aspect of the embodiments of the present disclosure, there is provided a touch display panel, including a touch panel of any one of above.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Embodiments will be described in detail herein, with the illustrations thereof represented in the drawings. When the following descriptions involve the drawings, like numerals in different drawings refer to like or similar elements unless otherwise indicated. The implements described in the following embodiments do not represent all implements consistent with the present disclosure. Rather, they are merely examples of apparatuses and methods consistent with some aspects of the present disclosure as detailed in the appended claims.

Figure 1:
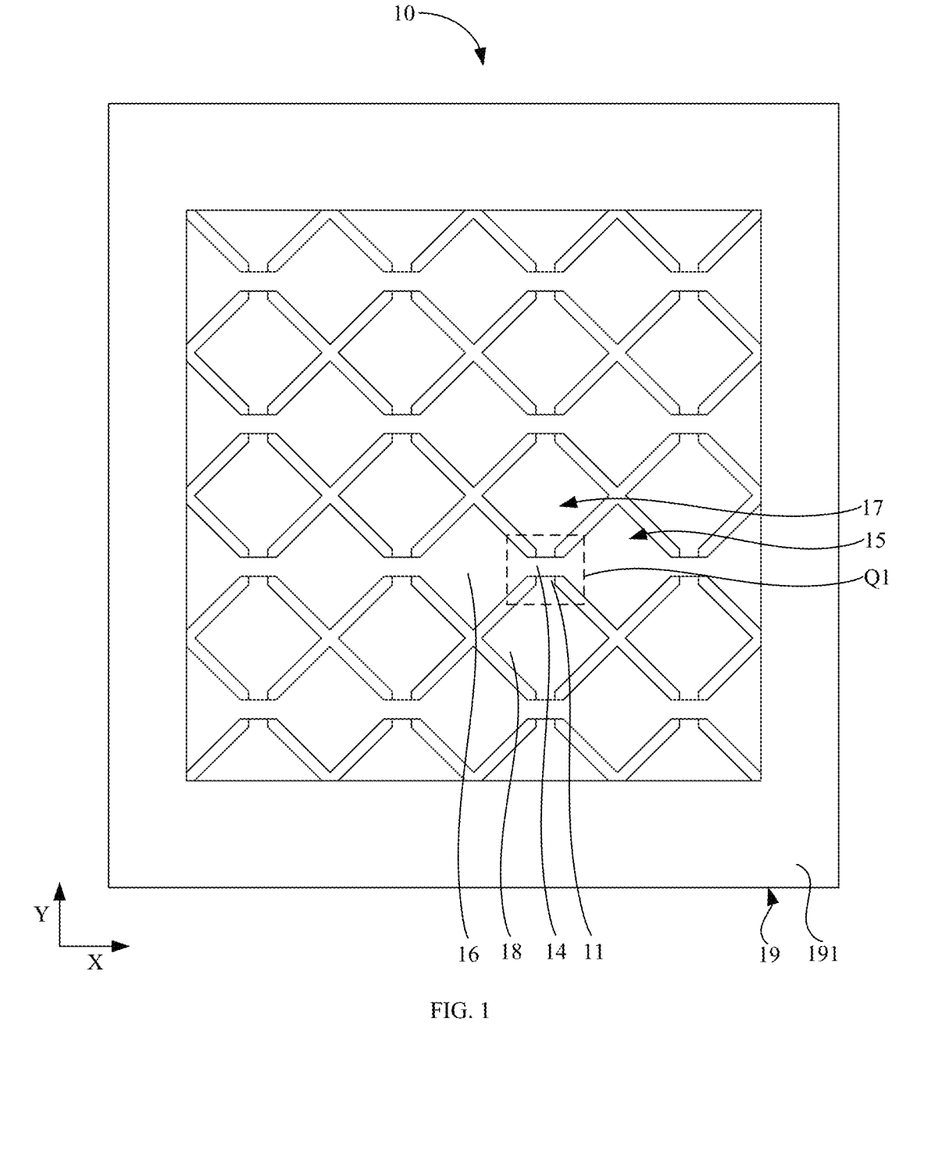
FIG. 1 shows a schematic diagram of a touch panel according to an implementation of the present disclosure.

The embodiment of the present disclosure provides a touch panel 10. As shown in FIG. 1, the touch panel 10 includes a bridging member 11, a connecting member 14, a first touch electrode 15, a second touch electrode 17, and a substrate 19. Here, the substrate 19 has a front surface 191. The bridging member 11, the connecting member 14, the first touch electrode 15, and the second touch electrode 17 are all located on the front surface 191. The front surface 191 serves as a surface of the substrate 19 for carrying a surface of the touch structure.

The front surface 191 has a first direction X and a second direction Y that are perpendicular to each other. In other implementations, the first direction X and the second direction Y may not be perpendicular, but merely intersect with each other. On the front surface 191, there are provided a plurality of first touch electrodes 15 extending in the first direction X and arranged in the second direction Y. The first touch electrode 15 includes a plurality of first sub electrodes 16, and adjacent first sub electrodes 16 are electrically connected to each other via a connecting member 14. On the front surface 191, there are also provided a plurality of second touch electrodes 17 extending in the second direction Y and arranged in the first direction X. The second touch electrode 17 includes a plurality of second sub electrodes 18, and adjacent second sub electrodes 18 are electrically connected to each other via a bridging member 11. The connecting member 14 partially overlaps with the bridging member 11 and is insulated from the bridging member 11.

Figure 2:
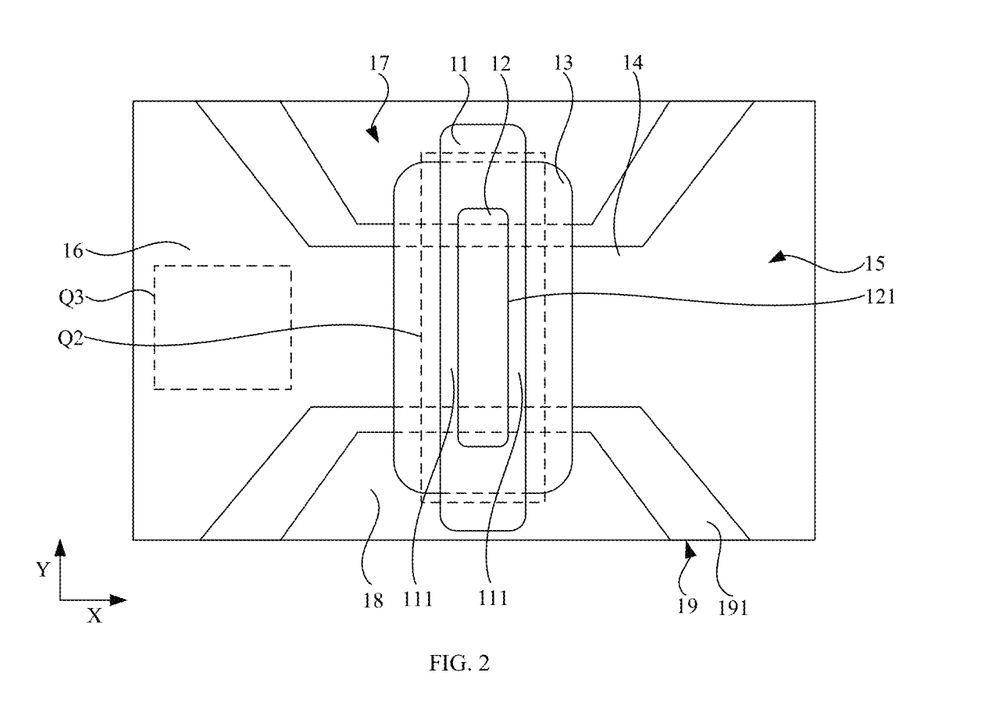
FIG. 2 shows a partial schematic diagram of a touch panel according to an implementation of the present disclosure.
Figure 3:
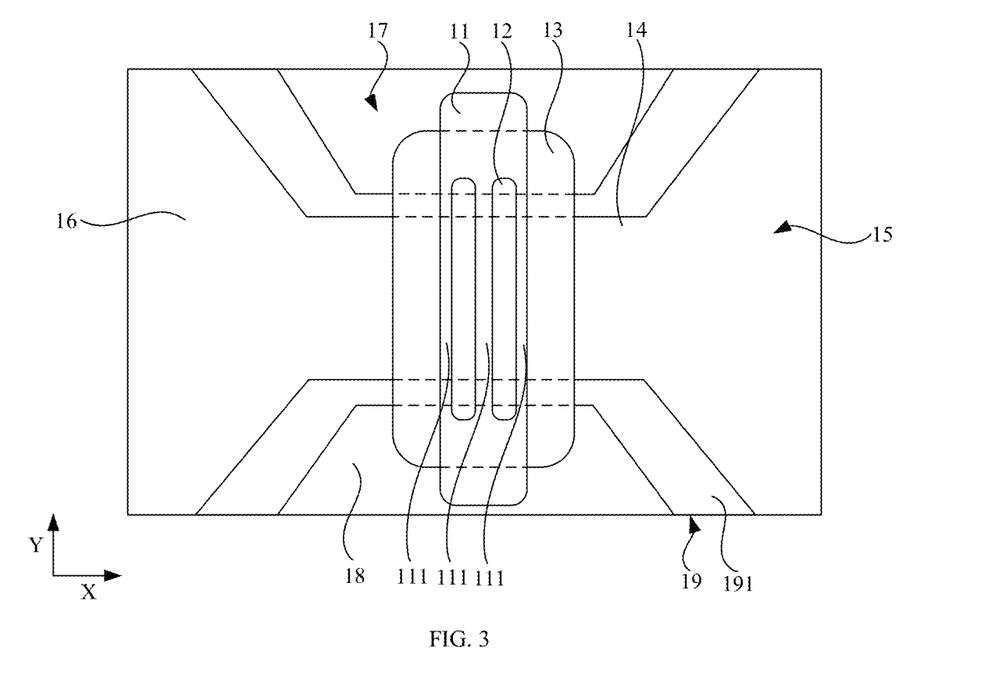
FIG. 3 shows a partial schematic diagram of another touch panel according to an implementation of the present disclosure.

FIG. 2 is a partial enlarged view of area Q1 in FIG. 1. In order to more clearly display the structure of area Q1, the view in FIG. 2 shows the structure of area Q1 from the side of the substrate 19 away from the front surface 191. As shown in FIG. 2, there is provided a connecting member 14 and first touch electrodes 15 extending along the first direction X on the front surface 191. The first touch electrode 15 includes a first sub electrode 16. Here, the connecting member 14 is electrically connected to adjacent first sub electrodes 16, and the connecting member 14 can be formed as a one piece with the first touch electrode 15. On the front surface 191, there is also provided a bridging member 11 and second touch electrodes 17 along the second direction Y. The second touch electrode 17 includes a second sub electrode 18. The bridging member 11 is electrically connected to adjacent second sub electrodes 18. The bridging member 11 partially overlaps with the connecting member 14 and is insulated from the connecting member 14. Specifically, there is provided an insulating film 13 between the bridging member 11 and the connecting member 14. The insulating film 13 can insulate the bridging member 11 from the connecting member 14. A projection of the overlapping part between the bridging member 11 and the connecting member 14 on the substrate 19 is located within a projection of the insulating film 13 on the substrate 19, and projections of the first sub electrode 16 and the second sub electrode 18 on the substrate 19 are at most partially located within the projection of the insulating film 13 on the substrate 19. For example, the projection of the first sub electrode 16 on the substrate 19 is located outside the projection of the insulating film 13 on the substrate 19, the projection of the second sub electrode 18 on the substrate 19 is partially located within the projection of the insulating film 13 on the substrate 19, and both ends of the bridging member 11 extend out of the insulating film 13 and are electrically connected to adjacent second sub electrodes 18 respectively. The bridging member 11 is provided with at least one transparent hole 12. For example, one transparent hole 12 can be provided on the bridging member 11, or two transparent hole 12 can be provided on the bridging member 11, or three transparent hole 12 can be provided on the bridging member 11, but not limited thereto. At least one transparent hole 12 divides the bridging member 11 into at least two sub bridging members 111 respectively located on the two sides of the transparent hole 12. For example, one transparent hole 12 divides the bridging member 11 into two sub bridging members 111, or two transparent holes 12 divide the bridging member 11 into three sub bridging members 111, or three transparent holes 12 divide the bridging member 11 into four sub bridging members 111, but not limited thereto. The insulating film 13 can be located in each transparent hole 12 to fill each transparent hole 12 with a part of the insulating film 13, or each transparent hole 12 can be left unfilled with any insulating film 13 to keep each transparent hole 12 hollow. FIG. 3 shows a solution in which two transparent holes 12 are provided on the bridging member 11. As shown in FIG. 3, two transparent holes 12 can be provided on the bridging member 11. The two transparent holes 12 divide the bridging member 11 into three sub bridging members 111. The two transparent holes 12 extend along the length direction of the bridging member 11 and can be arranged side by side on the bridging member 11, but are not limited thereto. In other implementations, at least two transparent holes 12 can be arranged on the bridging member 11 in other ways.

Figure 4:
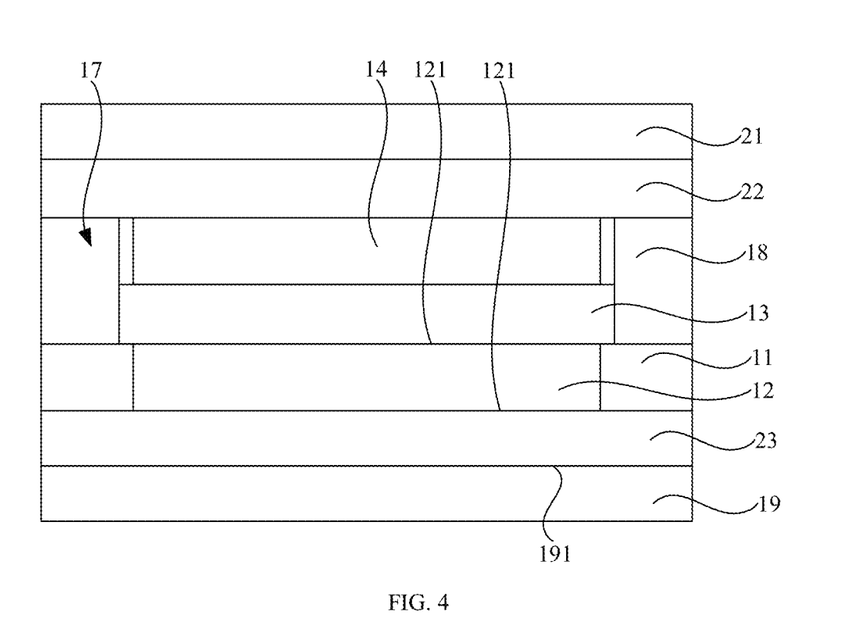
FIG. 4 shows a partial cross-sectional view of a touch panel according to an implementation of the present disclosure.

FIG. 4 shows a cross-sectional view of the touch panel 10 along the length direction of the bridging member 11 in area Q2 in FIG. 2. As shown in FIG. 4, the touch panel 10 also includes a passivation layer 21, a first vanishing layer 22, and a second vanishing layer 23. Specifically, the second vanishing layer 23 is located on the side of the bridging member 11 proximate to the substrate 19. The first vanishing layer 22 is located on the side of the bridging member 14 away from the substrate 19, that is, the second vanishing layer 23 is located on the front surface 191 of the substrate 19. The first vanishing layer 22 is located on the side of the second vanishing layer 23 away from the substrate 19. Here, the first vanishing layer 22 and the second vanishing layer 23 are configured to absorb lights passing through the touch panel 10 and make properties of the lights passing through the touch panel 10 similar, thereby achieving the effect as if the structure of the touch panel 10 was invisible, and thus avoiding significant differences in the properties of the lights passing through the touch panel 10, which would affect the display effect. The materials of the first and second vanishing layers 22 and 23 can be silicon oxide or silicon nitride, but are not limited thereto. An insulating material is provided between the connecting member 14 and the adjacent second sub electrodes 18. The bridging member 11, the insulating film 13, and the connecting member 14 are located between the first vanishing layer 22 and the second vanishing layer 23. The bridging member 11 is located on the side of the second vanishing layer 23 away from the substrate 19. The insulating film 13 is located on the side of the bridging member 11 away from the second vanishing layer 23. The connecting member 14 is located on the side of the insulating film 13 away from the bridging member 11. The passivation layer 21 is located on the side of the first vanishing layer 22 away from the connecting member 14. Here, the passivation layer 21 can play an insulating function and cover the entire touch panel 10. Alternatively, the passivation layer 21 can be graphically processed so that the projections of metal wires in the touch panel 10 on the substrate 19 are all within the projection of the passivation layer 21 on the substrate 19.

Figure 5:
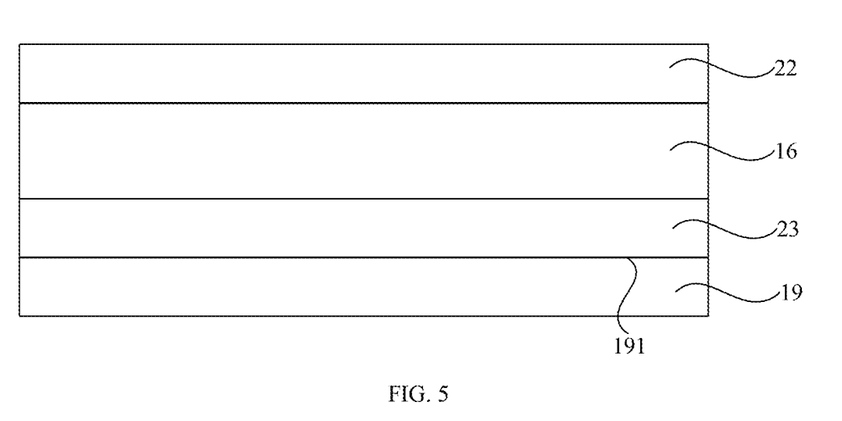
FIG. 5 shows another partial cross-sectional view of a touch panel according to an implementation of the present disclosure.

FIG. 5 shows a cross-sectional view of the touch panel 10 in area Q3 in FIG. 2. As shown in FIG. 5, the second vanishing layer 23 is located on the front surface 191 of the substrate 19. The first vanishing layer 22 is located on the side of the second vanishing layer 23 away from the substrate 19, and the second touch electrode 17 is located between the first vanishing layer 22 and the second vanishing layer 23. It should be pointed out that FIG. 5 is an exemplary cross-sectional view showing the area Q3 in FIG. 2. Therefore, only one first sub electrode 16 is shown in the figure located between the first vanishing layer 22 and the second vanishing layer 23. However, in other film layer structures similar to area Q3, the first touch electrode 15 and the second touch electrode 17 are also located between the first and second vanishing layers 23.

In conventional solution, due to differences in the film structure between area Q2 and area Q3, the properties of the lights passing through area Q2 and area Q3 are also different, resulting in different lights passing through area Q2 and area Q3. As a result, the film structure in area Q2 has a higher visibility and can be directly observed, thereby damaging the display effect. In the present implementation, since the bridging member 11 is provided with a transparent hole 12, light that would pass through the bridging member 11 can pass through the transparent hole 12, to reduce the light passing through the bridging member 11. Therefore, the light passing through area Q2 and the light passing through area Q3 can pass through relatively similar film structures, and the properties of the light passing through area Q2 can be similar to those passing through area Q3, thereby reducing the visibility of the film structure in area Q2, which can avoid the direct observation of the film structure in area Q2 and improve the display effect. In addition, when the transparent hole 12 is not filled with insulating material, the transparent hole 12 can reduce a contact area between the bridging member 11 and the insulating film 13, thereby improving stress matching between the bridging member 11 and the insulating film 13, and thereby improving the adhesion between the bridging member 11 and the insulating film 13. In addition, due to the presence of a transparent hole 12 on the bridging member 11, it is possible to divide the bridging member 11 into at least two sub bridging members 111 respectively located on two sides of the transparent hole 12 by at least one transparent hole 12. Therefore, when the bridging member 11 is subjected to static discharge, even if one sub bridging member 111 is damaged or broken due to static discharge, the other sub bridging members 111 can still work normally, thereby improving the anti-static discharge ability of the bridging member 11.

Figure 6:
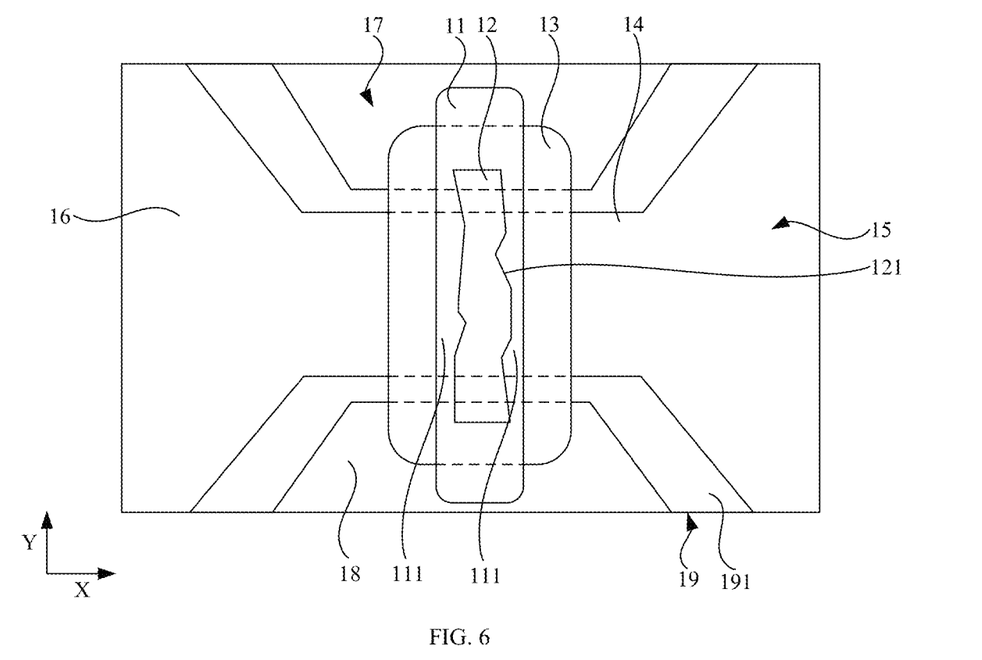
FIG. 6 shows a partial schematic diagram of another touch panel according to an implementation of the present disclosure.

In some implementations, as shown in FIGS. 4 and 6, one transparent hole 12 penetrates the bridging member 11 to form two hole edges 121, but not limited thereto. The two hole edges 121 are located on the side of the bridging member 11 proximate to the connection member 14 and on the side away from the connection member 14, respectively. In addition, the hole edge 121 can be a continuous arc with irregular variation, or the hole edge 121 can be a double-segment polyline with irregular variation, or the hole edge 121 can be a triple-segment polyline with irregular variation, but not limited thereto. Such configuration allows light to be scattered in various directions by the irregular hole edge 121 when passing through the bridging member 11, as the hole edge 121 is an arc or a polyline with irregular variation. This further reduces the visibility of the film structure in area Q2, further avoiding the problem of the film structure in area Q2 being directly observed and improving the display effect.

In some implementations, the shape of the transparent hole 12 is the same as that of the bridging member 11. It should be pointed out that even if the shape of the transparent hole 12 is indistinguishable from the shape of the bridging member 11 by the naked eye, the transparent hole 12 and the bridging member 11 also belong to the same shape. Such configuration can make the design and preparation of the transparent hole 12 more convenient, thereby reducing process difficulty and production costs.

In some implementations, the transparent hole 12 is disposed at the center of the bridging member 11. Such configuration can further make the design and preparation of the transparent hole 12 more convenient, thereby further reducing the difficulty of the process and reducing production costs.

In some implementations, the projection of the transparent hole 12 on the substrate 19 coincides at least partially with the projection of the second touch electrode 17 on the substrate 19. With such configuration, the portion of the bridging member 11 that does not overlap with the second touch electrode 17 can be provided with a transparent hole 12 as much as possible, thereby ensuring that the light passing through area Q2 and the light passing through area Q3 can pass through relatively similar film structures and thus the properties of the light passing through area Q2 can be similar to those passing through area Q3, thereby reducing the visibility of the film structure in area Q2, which can avoid the direct observation of the film structure in area Q2 and improve the display effect.

In some implementations, the bridging member 11 and the connecting member 14 are insulated from each other through an insulating film 13, no insulating material is provided between the first touch electrode 15 and the second touch electrode 17, and an insulating material provided in the transparent hole 12. The insulating material in the transparent hole 12, the insulating material between the first touch electrode 15 and the second touch electrode 17, and the insulating material forming the insulating film 13 are the same insulating material. Such configuration can reduce the variety of materials, thereby reducing the difficulty of design and preparation, thereby reducing the difficulty of the process and reducing production costs.

In some implementations, the materials of the first touch electrode 15, the second touch electrode 17, the connecting member 14, and the bridging member 11 all include transparent conductive materials.

In some implementations, the transparent conductive material may be indium tin oxide (ITO), but is not limited thereto.

In some implementations, one transparent hole 12 penetrates the bridging member 11 to form two hole edges 121, and the shape of the hole edge 121 located on the side of the bridging member 11 proximate to the connecting member 14 is different from that of the hole edge 121 located on the side of the bridging member 11 away from the connecting member 14. With such configuration, due to the different shapes of the hole edges 121 located on the side of the bridging member 11 proximate to the connecting member 14 and of the hole edges 121 located on the side of the bridging member 11 away from the connecting member 14, lights can be scattered in various directions by the two hole edges 121 with different shapes when passing through the bridging member 11, thereby further reducing the visibility of the film layer structure in area Q2. It can further avoid the problem of directly observing the film structure in area Q2 and improve the display effect.

In some implementations, one transparent hole 12 is provided on the bridging member 11. Here, the width of the bridging member 11 extends in the first direction X, and the length of the bridging member 11 extends in the second direction Y. In addition, the width of the transparent hole 12 extends in the first direction X, and the length of the transparent hole 12 extends in the second direction Y. The width of the transparent hole 12 at its widest part is 43%-86% of the width of the bridging member 11. For example, the width of the transparent hole 12 at its widest part can be 43% of the width of the bridging member 11, or the width of the transparent hole 12 at its widest part can be 50% of the width of the bridging member 11, or the width of the transparent hole 12 at its widest part can be 60% of the width of the bridging member 11, or the width of the transparent hole 12 at its widest part can be 71% of the width of the bridging member 11, or the width of the transparent hole 12 at its widest part can be 86% of the width of the bridging member 11, but not limited thereto. Preferably, the width of the transparent hole 12 at its widest part can be 71% of that of the bridging member 11. The length of the transparent hole 12 at the longest length is 54%-73% of the length of the bridge element 11. For example, the length of the transparent hole 12 at the longest length can be 54% of the length of the bridging member 11, or the length of the transparent hole 12 at the longest length can be 60% of the length of the bridging member 11, or the length of the transparent hole 12 at the longest length can be 69% of the length of the bridging member 11, or the length of the transparent hole 12 at the longest length can be 73% of the length of the bridging member 11, but not limited thereto. Preferably, the length of the transparent hole 12 at the longest length can be 69% of the length of the bridging member 11. Such configuration can effectively reduce the visibility of the film layer structure in area Q2 with the transparent hole 12, while minimizing the impact on the conductivity of the bridging member 11.

In some implementations, the bridging member 11 can be a rectangle with a width of 70 mm and a length of 260 mm. The width of the transparent hole 12 at its widest part can be 30 mm-60 mm. For example, the width of the transparent hole 12 at its widest part can be 30 mm, or the width of the transparent hole 12 at its widest part can be 40 mm, or the width of the transparent hole 12 at its widest part can be 50 mm, or the width of the transparent hole 12 at its widest part can be 60 mm, but not limited thereto. Preferably, the width of the transparent hole 12 at its widest part can be 50 mm. The length of transparent hole 12 can be 140 mm-190 mm. For example, the longest length of transparent hole 12 can be 140 mm, or the longest length of transparent hole 12 can be 160 mm, or the longest length of transparent hole 12 can be 170 mm, or the longest length of transparent hole 12 can be 180 mm, or the longest length of transparent hole 12 can be 190 mm, but not limited thereto. Preferably, the length of the transparent hole 12 at the longest length can be 180 mm.

In some implementations, at least two transparent holes 12 are provided on the bridging member 11 and are arranged along the length direction of the bridging member 11. Along the width direction of bridging member 11, the width of each transparent hole 12 at its widest part can be 43%-86% of the width of bridging member 11. For example, the width of each transparent hole 12 at its widest part can be 43% of the width of bridging member 11, or the width of each transparent hole 12 at its widest part can be 50% of the width of bridging member 11, or the width of each transparent hole 12 at its widest part can be 60% of the width of bridging member 11, or the width of each transparent hole 12 at its widest part can be 71% of the width of bridging member 11, or, the width of each transparent hole 12 at its widest part can be 86% of the width of bridging member 11, but not limited thereto. Preferably, the width of each transparent hole 12 at its widest part can be 71% of the width of the bridging member 11. The maximum value of the sum of at least two transparent holes 12 along the length direction of bridging member 11 can be 54%-73% of the length of bridging member 11. For example, the maximum value of the sum of at least two transparent holes 12 can be 54% of the length of bridging member 11, or the maximum value of the sum of at least two transparent holes 12 can be 60% of the length of bridging member 11, or the maximum value of the sum of at least two transparent holes 12 can be 69% of the length of bridging member 11, or the maximum value of the sum of at least two transparent holes 12 can be 73% of the length of bridging member 11, but not limited thereto. Preferably, the maximum value of the sum of the lengths of at least two transparent holes 12 can be 69% of the length of the bridging member 11. Such configuration can effectively reduce the visibility of the film layer structure in area Q2 with at least two transparent holes 12, while minimizing the impact on the conductivity of the bridging member 11.

In some implementations, the bridging member 11 can be a rectangle with a width of 70 mm and a length of 260 mm. When there are at least two transparent holes 12 arranged along the length direction of the bridging member 11 on the bridging member 11, the width of each transparent hole 12 at its widest part along the width direction of the bridging member 11 can be 30 mm-60 mm. For example, the width of each transparent hole 12 at its widest part can be 30 mm, or the width of each transparent hole 12 at its widest part can be 40 mm, or the width of each transparent hole 12 at its widest part can be 50 mm, or the width of each transparent hole 12 at its widest part can be 60 mm, but not limited thereto. Preferably, the width of each transparent hole 12 at its widest part can be 50 mm. The maximum value of the sum of at least two transparent holes 12 along the length direction of bridging member 11 is 140 mm-190 mm. For example, the maximum value of the sum of the lengths of at least two transparent holes 12 can be 140 mm, or the maximum value of the sum of the lengths of at least two transparent holes 12 can be 160 mm, or the maximum value of the sum of the lengths of at least two transparent holes 12 can be 170 mm, or the maximum value of the sum of the lengths of at least two transparent holes 12 can be 180 mm, or the maximum value of the sum of the lengths of at least two transparent holes 12 can be 190 mm, but not limited thereto. Preferably, the maximum value of the sum of the lengths of at least two transparent holes 12 can be 180 mm.

In some implementations, at least two transparent holes 12 are provided on the bridging member 11 and are arranged along the width direction of the bridging member 11. Along the width direction of the bridging member 11, the maximum value of the sum of the widths of at least two transparent holes 12 can be 43%-86% of the width of bridging member 11. For example, the maximum value of the sum of the widths of at least two transparent holes 12 can be 43% of the width of bridging member 11, or the maximum value of the sum of the widths of at least two transparent holes 12 can be 50% of the width of bridging member 11, or the maximum value of the sum of the widths of at least two transparent holes 12 can be 60% of the width of bridging member 11, or the maximum value of the sum of the widths of at least two transparent holes 12 can be 71% of the width of bridging member 11, or, the maximum value of the sum of the widths of at least two transparent holes 12 can be 86% of the width of bridging member 11, but not limited thereto. Preferably, the maximum value of the sum of the widths of at least two transparent holes 12 can be 71% of the width of the bridging member 11. Along the length direction of bridging member 11, the longest length of each transparent hole 12 can be 54%-73% of the length of bridging member 11. For example, the longest length of each transparent hole 12 can be 54% of the length of bridging member 11, or the longest length of each transparent hole 12 can be 60% of the length of bridging member 11, or the longest length of each transparent hole 12 can be 69% of the length of bridging member 11, or the longest length of each transparent hole 12 can be 73% of the length of bridging member 11, but not limited thereto. Preferably, the length of each transparent hole 12 at the longest part can be 69% of the length of the bridging member 11. Such configuration can effectively reduce the visibility of the film layer structure in area Q2 with at least two transparent holes 12, while minimizing the impact on the conductivity of the bridging member 11.

In some implementations, the bridging member 11 can be a rectangle with a width of 70 mm and a length of 260 mm. When there are at least two transparent holes 12 arranged along the width direction of the bridging member 11 on the bridging member 11. Along the width direction of the bridging member 11, the maximum value of the sum of the widths of at least two transparent holes 12 can be 30 mm-60 mm. For example, the maximum value of the sum of the widths of at least two transparent holes 12 can be 30 mm, or the maximum value of the sum of the widths of at least two transparent holes 12 can be 40 mm, or the maximum value of the sum of the widths of at least two transparent holes 12 can be 50 mm, or the maximum value of the sum of the widths of at least two transparent holes 12 can be 60 mm, but not limited thereto. Preferably, the maximum value of the sum of the widths of at least two transparent holes 12 can be 50 mm. Along the length direction of bridging member 11, the length of each transparent hole 12 at the longest part can be 140 mm-190 mm. For example, the length of each transparent hole 12 at the longest part can be 140 mm, or the length of each transparent hole 12 at the longest part can be 160 mm, or the length of each transparent hole 12 at the longest part can be 170 mm, or the length of each transparent hole 12 at the longest part can be 180 mm, or the length of each transparent hole 12 at the longest part can be 190 mm, but not limited thereto. Preferably, the length of each transparent hole 12 at the longest part can be 180 mm.

Figure 7:
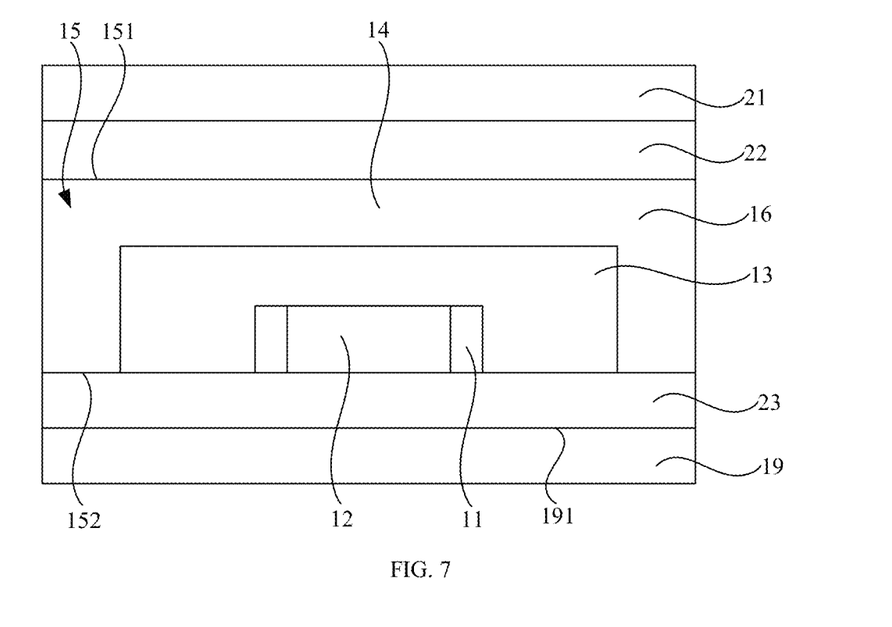
FIG. 7 shows a partial cross-sectional view of another touch panel according to an implementation of the present disclosure.

In some implementations, FIG. 7 shows a cross-sectional view of the touch panel 10 along the width direction of the bridging member 11 in area Q2 in FIG. 2. As shown in FIG. 7, the first touch electrode 15 is integrated with the connecting member 14. The thickness of the connecting member 14 is smaller than the thickness of the first sub electrode 16 located on either side of the connecting member 14, so that the first sub electrode 16 and the connecting member 14 jointly form a groove, and the bridging member 11 is arranged inside the groove and extends inside the groove. The thickness of bridging member 11 and the thickness of the connecting member 14 can be the same. Such configuration can further make the properties of the lights passing through area Q2 similar to those passing through area Q3, and further reduce the visibility of the film structure in area Q2 to avoid direct observation of the film structure in area Q2, which can further improve the display effect. In addition, the thickness of the bridging member 11 and the thickness of the connecting member 14 are the same, which can also eliminate the adjustment steps for the thickness of the bridging member 11 and the thickness of the connecting member 14, thereby simplifying the production process and reducing the difficulty of the production process. The first touch electrode 15 and the second touch electrode 17 both include first surfaces 151 and second surfaces 152 that are opposite to each other. The first surface 151 is located on the side far from the substrate between the first touch electrode 15 and the second touch electrode 17, and the second surface 152 is located on the side proximate to the substrate between the first touch electrode 15 and the second touch electrode 17. The surface of the connecting member 14 away from the bridging member 11 is flush with the first surface 151, and the surface of the bridging member 11 away from the connecting member 14 is flush with the second surface 152. Such configuration can make the sum of the thicknesses of the bridging member 11, the insulating film 13, and the connection member 14 less than or equal to the thickness of the first touch electrode 15 or of the second touch electrode 17, thereby improving the utilization of space and reducing the thickness of the touch panel.

Figure 8:
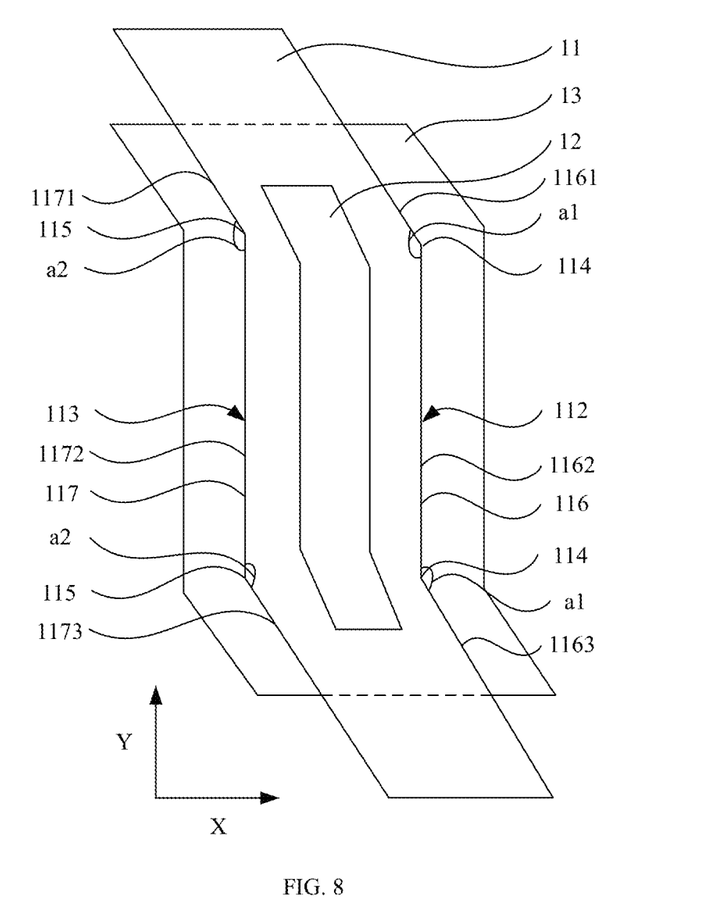
FIG. 8 shows a schematic diagram of a bridging member according to an implementation of the present disclosure.
Figure 9:
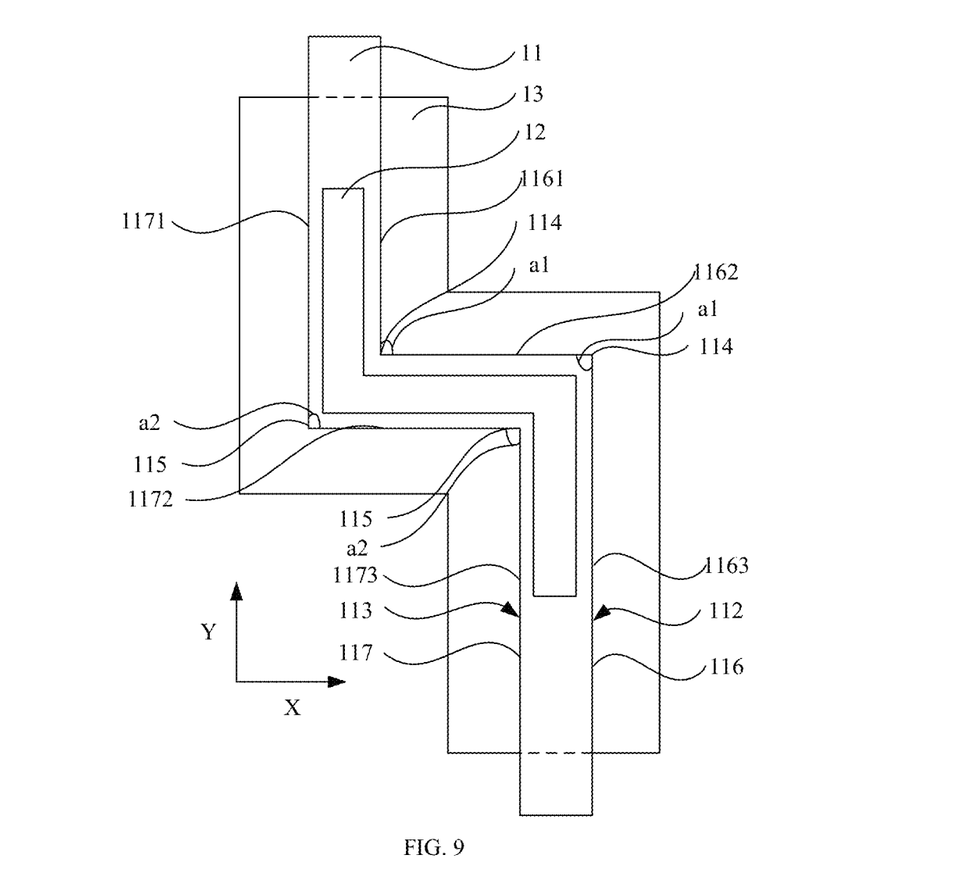
FIG. 9 shows a schematic diagram of another bridging member according to an implementation of the present disclosure.
Figure 10:
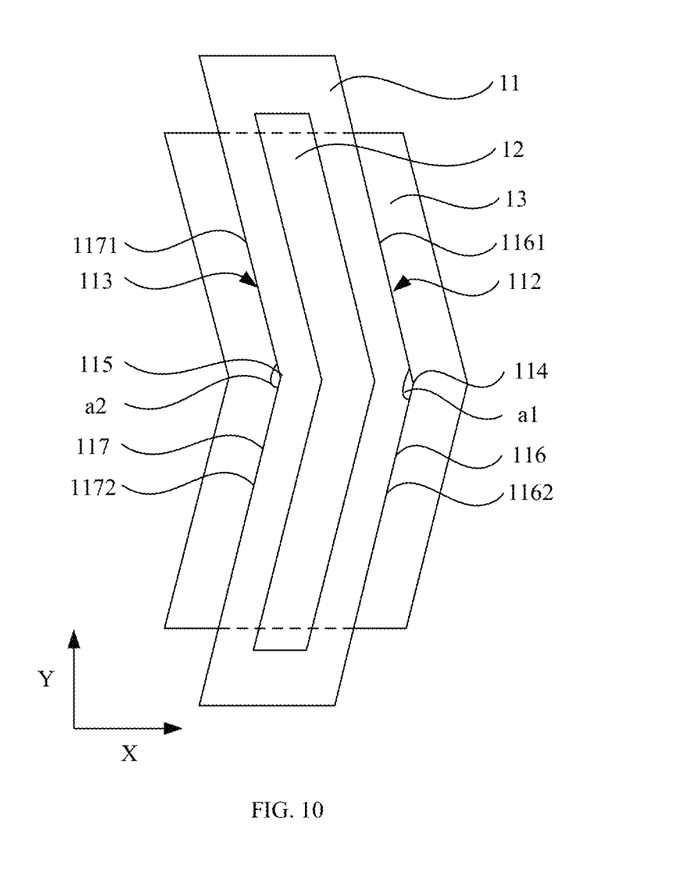
FIG. 10 shows a schematic diagram of another bridging member according to an implementation of the present disclosure.

In some implementations, FIGS. 8 to 10 illustrate several different shapes of bridging members 11. As shown in FIGS. 8 to 10, the bridging member 11 includes a first edge 112 and a second edge 113 respectively located on two sides of the bridging member 11. The first edge 112 includes at least one first turning point 114, and the second edge 113 includes at least one second turning point 115. At least one first turning point 114 divides the first edge 112 into at least two first sub edges 116. The at least one second turning point 115 divides the second edge 113 into at least two second sub edges 117. A first angle a1 between the first sub edges 116 and a second angle a2 between the second sub edges 117 are both greater than or equal to 90 degrees and less than 180 degrees. For example, the first angle a1 and the second angle a2 can both be 90 degrees, or the first angle a1 and the second angle a2 can both be 120 degrees, but not limited thereto. Such configuration can scatter the light passing through the bridging member 11 in different directions, thereby reducing the probability of light passing through the bridging member 11 propagating in a single direction, thereby reducing the visibility of the film structure in area Q2, further avoiding the problem of the film structure in area Q2 being directly observed, and improving the display effect.

In some implementations, as shown in FIG. 8, two first turning points 114 divide the first edge 112 into three first sub edges 116. Specifically, the three first sub edges 116 can be a first straight sub edge 1161, a second straight sub edge 1162, and a third straight sub edge 1163. Two second turning points 115 divide the second edge 113 into three second sub edges 117. Specifically, the three second sub edges 117 can be a fourth straight sub edge 1171, the fifth straight sub edge 1172, and the sixth straight sub edge 1173. Part of the first sub edge 116 and part of the second sub edge 117 are parallel to the first direction X and the second direction Y, while the other part of the first sub edge 116 and the other part of the second sub edge 117 are neither parallel nor perpendicular to the first direction X and the second direction Y. Specifically, the first straight sub edge 1161 and the fourth straight sub edge 1171 bend towards the side of the bridging member 11 proximate to the second touch electrode 17, the third straight sub edge 1163 and the sixth straight sub edge 1173 bend towards the side of the bridging member 11 proximate to the first touch electrode 15, and the second straight sub edge 1162 and the fifth straight sub edge 1172 are parallel to the second direction Y. In addition, the first angle a1 and the second angle a2 can both be 120 degrees, but not limited thereto. The first angle a1 and the second angle a2 can also be any angle greater than 90 degrees but less than 180 degrees. FIG. 8 shows an implementation, in which the shape of the bridging member 11 is not limited. Such configuration can scatter the light passing through the bridging member 11 in different directions, thereby reducing the probability of light passing through the bridging member 11 propagating in a single direction, thereby reducing the visibility of the film structure in area Q2, further avoiding the problem of the film structure in area Q2 being directly observed, and improving the display effect.

In some implementations, as shown in FIG. 9, two first turning points 114 divide the first edge 112 into three first sub edges 116. Specifically, the three first sub edges 116 can be the first straight sub edge 1161, the second straight sub edge 1162, and the third straight sub edge 1163. Two second turning points 115 divide the second edge 113 into three second sub edges 117. Specifically, the three second sub edges 117 can be the fourth straight sub edge 1171, the fifth straight sub edge 1172, and the sixth straight sub edge 1173. Each first sub edge 116 and each second sub edge 117 are parallel to the first direction X or the second direction Y. Specifically, the first line sub edge 1161, the fourth line sub edge 1171, the third line sub edge 1163, and the sixth line sub edge 1173 are all parallel to the second direction Y, and the second line sub edge 1162 and the fifth line sub edge 1172 are both parallel to the first direction X. In addition, the first angle a1 and the second angle a2 can both be 90 degrees. FIG. 9 shows an implementation, in which the shape of the bridging member 11 is not limited thereto. Such configuration can scatter the light passing through the bridging member 11 in different directions, thereby reducing the probability of light passing through the bridging member 11 propagating in a single direction, thereby reducing the visibility of the film structure in area Q2, further avoiding the problem of the film structure in area Q2 being directly observed, and improving the display effect.

In some implementations, as shown in FIG. 10, one first turning point 114 divides the first edge 112 into two first sub edges 116. Specifically, the two first sub edges 116 can be the first straight sub edge 1161 and the second straight sub edge 1162. One second turning point 115 divides the second edge 113 into two second sub edges 117. Specifically, the two second sub edges 117 can be the fourth straight sub edge 1171 and the fifth straight sub edge 1172. Each first sub edge 116 and each second sub edge 117 are neither parallel nor perpendicular to the first direction X or the second direction Y. Specifically, the first straight sub edge 1161, the second straight sub edge 1162, the fourth straight sub edge 1171, and the fifth straight sub edge 1172 are all bent towards the side of the bridging member 11 proximate to the second touch electrode 17. In addition, the first angle a1 and the second angle a2 can both be 120 degrees, but not limited thereto. The first angle a1 and the second angle a2 can also be any angle greater than 90 degrees but less than 180 degrees. FIG. 10 shows an implementation, in which the shape of the bridging member 11 is not limited. Such configuration can scatter the light passing through the bridging member 11 in different directions, thereby reducing the probability of light passing through the bridging member 11 propagating in a single direction, thereby reducing the visibility of the film structure in area Q2, further avoiding the problem of the film structure in area Q2 being directly observed, and improving the display effect.

The implementation of the present disclosure also provides a touch display panel that can be applied to application scenarios such as vehicle mounted display panels, including any of the aforementioned touch panels 10.

The above implementations of this application may complement each other without conflict.

It should be noted that in the drawings, the sizes of layers and regions can be exaggerated for clarity of illustration. It will also be understood that when an element or layer is referred to as being "on" another element or layer, it can be directly on the other element or intervening layers can be present. In addition, it will be understood that when an element or layer is referred to as being "under" another element or layer, it can be directly under the other element, or there can be more than one intervening layer or element. In addition, it can also be understood that when a layer or element is referred to as being "between" two layers or two elements, it can be the only layer between the two layers or two elements, or more than one intervening layer or element can also be present. Similar reference numerals indicate similar elements throughout.

The term "a plurality of" refers to two or more, unless otherwise specified.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It should be understood that the present disclosure is not limited to the precise structure already described and shown in the accompanying drawings, and various modifications and changes can be made without departing from its scope. The scope of the present disclosure is limited only by the appended claims.

What is claimed is:

1. A touch panel, wherein the touch panel comprises a substrate comprising a front surface; the front surface comprises a first direction and a second direction that intersect with each other;
   - a plurality of first touch electrodes extending in the first direction and arranged in the second direction are disposed on the front surface, the first touch electrode comprises a plurality of first sub electrodes, and adjacent first sub electrodes are electrically connected to each other via a connecting member;
   - a plurality of second touch electrodes extending in the second direction and arranged in the first direction are further disposed on the front surface, the second touch electrode comprises a plurality of second sub electrodes, and adjacent second sub electrodes are electrically connected to each other via a bridging member;
   - the connecting member partially overlaps with the bridging member and is insulated from the bridging member;
   - the bridging member is provided with at least one transparent hole penetrating the bridging member;
   - along a width direction of the bridging member, a width of each of the at least one transparent hole at a widest part or a maximum value of a sum of widths of at least two transparent holes of the at least one transparent hole is 43%-86% of a width of the bridging member;
   - along a length direction of the bridging member, a length of each of the at least one transparent hole at a longest part or a maximum value of a sum of lengths of at least two transparent hole of the at least one transparent hole is 54%-73% of a length of the bridging member.

2. The touch panel of claim 1, wherein one transparent hole is disposed on the bridging member;
   - a width of the transparent hole at the widest part is 43%-86% of the width of the bridging member, and a length of the transparent hole at the longest part is 54%-73% of the length of the bridging member.

3. The touch panel of claim 2, wherein the width of the transparent hole at the widest part is 30 mm-60 mm; and the length of the transparent hole at the longest part is 140 mm-190 mm.

4. The touch panel of claim 1, wherein at least two transparent holes are disposed on the bridging member and arranged along the length direction of the bridging member;
   - along the width direction of the bridging member, a width of each transparent hole at the widest part is 43%-86% of the width of the bridging member; and along the length direction of the bridging member, a maximum value of a sum of lengths of the at least two transparent hole is 54%-73% of the length of the bridging member.

5. The touch panel of claim 4, wherein along the width direction of the bridging member, the width of each transparent hole at the widest part is 30 mm-60 mm; and along the length direction of the bridging member, the maximum value of the sum of the lengths of the at least two transparent holes is 140 mm-190 mm.

6. The touch panel of claim 1, wherein at least two transparent holes are disposed on the bridging member and arranged along the width direction of the bridging member;
along the width direction of the bridging member, a maximum value of a sum of widths of the at least two transparent holes is 43%-86% of the width of the bridging member; and along the length direction of the bridging member, a length of each transparent hole at the longest part is 54%-73% of the length of the bridging member.

7. The touch panel of claim 6, wherein along the width direction of the bridging member, a maximum value of a sum of widths of the at least two transparent holes is 30 mm-60 mm; and
along the length direction of the bridging member, the length of each transparent hole at the longest part is 140 mm-190 mm.

8. The touch panel of claim 1, wherein the at least one transparent hole penetrates the bridging member to form at least two hole edges; and the at least two hole edges have different shapes.

9. The touch panel of claim 1, wherein the at least one transparent hole penetrates the bridging member to form at least two hole edges; and the hole edge has a shape selected from a group consisting of: a continuous arc with irregular variation, a double-segment polyline with irregular variation, and a triple-segment polyline with irregular variation.

10. The touch panel of claim 1, wherein the transparent hole has a shape the same as a shape of the bridging member.

11. The touch panel of claim 10, wherein the transparent hole is disposed at a center of the bridging member.

12. The touch panel of claim 1, wherein a projection of the transparent hole on the substrate overlaps at least partially with a projection of the second touch electrode on the substrate.

13. The touch panel of claim 1, wherein the bridging member and the connecting member are insulated from each other through an insulating film, and an insulating material is provided between the first touch electrode and the second touch electrode, and an insulating material is provided in the transparent hole;
the insulating material in the transparent hole, the insulating material between the first touch electrode and the second touch electrode, and the insulating material forming the insulating film are the same insulating material.

14. The touch panel of claim 1, wherein the touch panel further comprises a passivation layer, a first vanishing layer, and a second vanishing layer; the second vanishing layer is located on a side of the bridging member proximate to the substrate, and the first vanishing layer is located on a side of the connecting member away from the substrate; the passivation layer is located on a side of the first vanishing layer away from the connecting member.

15. The touch panel of claim 1, wherein materials of the first touch electrode, the second touch electrode, the connecting member, and the bridging member all comprise transparent conductive materials.

16. The touch panel of claim 15, wherein the transparent conductive material comprises indium tin oxide.

17. The touch panel of claim 1, wherein the first touch electrode is integrally formed with the connecting member; a thickness of the connecting member is smaller than a thickness of the first touch electrode, so that the first sub electrode and the connecting member jointly form a groove, and the bridging member is arranged in the groove; the first touch electrode comprises a first surface and a second surface opposite each other; a surface of the connecting member away from the bridging member is flush with the first surface, and a surface of the bridging member away from the connecting member is flush with the second surface.

18. The touch panel of claim 1, wherein the bridging member comprises a first edge and a second edge located respectively on two sides of the bridging member; each of the first edge and the second edge comprises at least one turning point, wherein the at least one turning point divides the first edge into at least two first sub edges, and the at least one turning point divides the second edge into at least two second sub edges; each of an angle between the first sub edges and an angle between the second sub edges is greater than or equal to 90 degrees and less than 180 degrees.

19. The touch panel of claim 18, wherein part of the first sub edges and some of the second sub edges are parallel to the first direction or the second direction, while the other part of the first sub edges and the other part of the second sub edges are neither parallel nor perpendicular to the first direction or the second direction;
or, each first sub edge and each second sub edge are parallel to the first direction or the second direction;
or, each first sub edge and each second sub edge are neither parallel nor perpendicular to the first direction or the second direction.

20. A touch display panel, comprising the touch panel of claim 1.

* * * * *